(12) United States Patent
Gu et al.

(10) Patent No.: US 11,731,389 B2
(45) Date of Patent: Aug. 22, 2023

(54) GRADED LATTICE ENERGY-ABSORBING STRUCTURE, CHIRAL CELL THEREOF HAVING PROGRAMMABLE STIFFNESS, AND 3D PRINTING METHOD

(71) Applicant: NANJING UNIVERSITY OF AERONAUTICS AND ASTRONAUTICS, Nanjing (CN)

(72) Inventors: Dongdong Gu, Nanjing (CN); Jie Gao, Nanjing (CN); Chenglong Ma, Nanjing (CN); Yingjie Song, Nanjing (CN); Wei Chen, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/796,919

(22) PCT Filed: Aug. 25, 2021

(86) PCT No.: PCT/CN2021/114459
§ 371 (c)(1),
(2) Date: Aug. 2, 2022

(87) PCT Pub. No.: WO2022/042580
PCT Pub. Date: Mar. 3, 2022

(65) Prior Publication Data
US 2023/0053918 A1 Feb. 23, 2023

(30) Foreign Application Priority Data
Aug. 29, 2020 (CN) .......................... 202010890835.4

(51) Int. Cl.
*B32B 3/20* (2006.01)
*B32B 3/14* (2006.01)
(Continued)

(52) U.S. Cl.
CPC .................. *B32B 3/20* (2013.01); *B32B 3/14* (2013.01); *B32B 15/01* (2013.01); *B33Y 10/00* (2014.12);
(Continued)

(58) Field of Classification Search
CPC .. B32B 3/14; B32B 3/20; B32B 15/01; A47C 23/002; A47C 27/065
(Continued)

(56) References Cited

U.S. PATENT DOCUMENTS 2,167,029 A * 7/1939 McLafferty ............. E04C 5/065
52/262
2,212,481 A * 8/1940 Sendzimir .............. B21D 31/04
428/592

(Continued)

FOREIGN PATENT DOCUMENTS

CN 107498948 A 12/2017
CN 109163212 A 1/2019
(Continued)

OTHER PUBLICATIONS

Liang Meng, et al; An emerging class of hyperbolic lattice exhibiting tunable elastic properties and impact absorption through chiral twisting; Extreme Mechanics Letters; vol. 40, Jul. 13, 2020, No. 100869; 19 pgs.

(Continued)

*Primary Examiner* — Brian D Mattei
*Assistant Examiner* — Joseph J. Sadlon
(74) *Attorney, Agent, or Firm* — Hauptman Ham, LLP (57) ABSTRACT

A chiral cell includes a cell structure. The cell structure includes an upper ring, a middle ring, a lower ring, upper connecting rods, and lower connecting rods. The upper ring and the lower ring have the same geometrical shape, and the middle ring is located between the upper ring and the lower (Continued)

ring. A plurality of upper connecting rods is provided; the two ends of each upper connecting rod are respectively correspondingly connected to the upper ring and the middle ring and the upper connecting rods are obliquely and uniformly distributed between the upper ring and the middle ring; a plurality of lower connecting rods is provided; the two ends of each lower connecting rod are respectively correspondingly connected to the lower ring and the middle ring and the lower connecting rods are obliquely and uniformly distributed between the lower ring and the middle ring.

8 Claims, 5 Drawing Sheets

(51) Int. Cl.
*B32B 15/01* (2006.01)
*B33Y 10/00* (2015.01)

(52) U.S. Cl.
CPC ..... *B32B 2307/51* (2013.01); *B32B 2307/558* (2013.01); *B32B 2307/56* (2013.01)

(58) Field of Classification Search
USPC .................. 52/648.1, 167.1; 5/719
See application file for complete search history.

(56) References Cited

U.S. PATENT DOCUMENTS

| | | | | |
|---|---|---|---|---|
| 2,690,074 A * | 9/1954 | Jones | ...... | E04H 9/021 52/383 |
| 3,200,489 A * | 8/1965 | Keeleric | ...... | B31D 3/02 428/116 |
| 3,376,684 A * | 4/1968 | Cole | ...... | E04C 2/3405 52/783.17 |
| 3,407,560 A * | 10/1968 | Baumann | ...... | E04C 5/064 52/645 |
| 3,664,906 A * | 5/1972 | Hartig | ...... | B29C 66/54 428/116 |
| 3,925,941 A * | 12/1975 | Pearce | ...... | A63B 9/00 52/80.2 |
| 4,194,255 A * | 3/1980 | Poppe | ...... | A47C 27/065 428/116 |
| 4,292,375 A * | 9/1981 | Ko | ...... | B21D 26/055 244/119 |
| 4,495,237 A * | 1/1985 | Patterson | ...... | E04C 2/3405 156/291 |
| 4,711,057 A * | 12/1987 | Lew | ...... | E04B 1/3211 52/648.1 |
| 5,018,701 A * | 5/1991 | 012aki | ...... | F16F 15/046 267/141.1 |
| 5,426,799 A * | 6/1995 | Ottiger | ...... | A47C 23/06 5/247 |
| 5,736,221 A * | 4/1998 | Hardigg | ...... | B29C 65/02 428/116 |
| 6,704,960 B1 * | 3/2004 | Lumgair | ...... | A47C 27/14 5/719 |
| 6,767,619 B2 * | 7/2004 | Owens | ...... | B29C 48/12 52/576 |
| 7,226,245 B2 * | 6/2007 | Kent | ...... | B28B 7/183 405/35 |
| 7,404,223 B2 * | 7/2008 | Manuszak | ...... | A47C 27/064 5/256 |
| 7,424,967 B2 * | 9/2008 | Ervin | ...... | B32B 3/12 428/116 |
| 7,469,513 B2 * | 12/2008 | Schipani | ...... | E04C 3/005 52/646 |
| 7,757,931 B2 * | 7/2010 | Straza | ...... | B23K 1/008 228/193 |
| 8,185,988 B2 * | 5/2012 | Wieland | ...... | A47C 23/05 5/247 |
| 8,320,727 B1 * | 11/2012 | Jacobsen | ...... | B29D 11/00663 264/1.24 |
| 8,616,328 B2 * | 12/2013 | Daraio | ...... | G10K 11/26 52/80.1 |
| 8,745,958 B2 * | 6/2014 | Kang | ...... | E04B 1/19 52/745.19 |
| 8,815,038 B2 * | 8/2014 | McCarville | ...... | B32B 27/12 156/286 |
| 9,097,308 B2 * | 8/2015 | Lobry | ...... | F16F 1/36 |
| 9,162,416 B1 * | 10/2015 | Eckel | ...... | G02B 6/1221 |
| 9,375,864 B2 * | 6/2016 | Hundley | ...... | B29C 64/135 |
| 9,789,664 B2 * | 10/2017 | Cook, III | ...... | E04B 1/19 |
| 9,823,143 B2 * | 11/2017 | Twelves, Jr. | ...... | B60N 3/048 188/377 |
| 9,915,036 B2 * | 3/2018 | Penland, Jr. | ...... | A47C 23/05 5/247 |
| 10,549,505 B2 * | 2/2020 | Tibbits | ...... | A47C 27/14 5/719 |
| 10,553,875 B2 * | 2/2020 | Greer | ...... | A47C 27/065 428/116 |
| 10,668,695 B2 * | 6/2020 | Cacace | ...... | F16F 1/36 |
| 10,816,280 B2 * | 10/2020 | Vos | ...... | B23P 15/26 |
| 10,828,869 B2 * | 11/2020 | Adams | ...... | A43B 5/0401 |
| 10,920,422 B2 * | 2/2021 | Zhang | ...... | A47C 27/064 5/256 |
| 11,248,071 B2 * | 2/2022 | Liu | ...... | F16F 15/046 267/141.1 |
| 11,440,097 B2 * | 9/2022 | Jones | ...... | B22F 10/28 |
| 11,498,250 B2 * | 11/2022 | Jenett | ...... | F16S 5/00 |
| 2010/0291401 A1 * | 11/2010 | Medina | ...... | B23K 26/32 219/121.66 |
| 2014/0336680 A1 * | 11/2014 | Medina | ...... | B22F 10/68 219/121.72 |
| 2016/0160952 A1 * | 6/2016 | Schaedler | ...... | B60N 3/048 188/377 |
| 2018/0299066 A1 * | 10/2018 | Erno | ...... | F16S 5/00 |
| 2020/0023584 A1 | 1/2020 | Portela et al. | | |
| 2021/0323263 A1 * | 10/2021 | Cagle | ...... | E04C 5/065 52/262 |
| 2022/0079280 A1 * | 3/2022 | Laperriere | ...... | A43B 5/0401 |

FOREIGN PATENT DOCUMENTS

| | | |
|---|---|---|
| CN | 110929358 A | 3/2020 |
| CN | 112356523 A | 2/2021 |
| FR | 3033518 A1 | 9/2016 |

OTHER PUBLICATIONS

International Search Report in Corresponding International Application No. PCT/CN2021/114459, dated Nov. 11, 2021; 7 pgs.
Written Opinion in Corresponding International Application No. PCT/CN2021/114459, dated Nov. 11, 2021; 10 pgs.

* cited by examiner

FIG. 1

Before deformation

After deformation

GRADED LATTICE ENERGY-ABSORBING STRUCTURE, CHIRAL CELL THEREOF HAVING PROGRAMMABLE STIFFNESS, AND 3D PRINTING METHOD

RELATED APPLICATIONS

The present application is a U.S. National Phase of International Application Number PCT/CN2021/114459 filed Aug. 25, 2021, and claims priority to Chinese Application Number 202010890835.4 filed Aug. 29, 2020.

TECHNICAL FIELD

The present disclosure relates to a chiral cell having programmable stiffness, which is used for forming a lattice structure.

The present disclosure also relates to a graded lattice energy-absorbing structure, and more particularly to a graded lattice energy-absorbing structure based on the chiral cell having programmable stiffness.

The present disclosure further relates to a 3D printing method for forming the foregoing graded lattice energy-absorbing structure.

BACKGROUND

Having excellent characteristics such as light weight, high specific stiffness, high specific strength, sound absorption and heat insulation, etc., the lattice structure is increasingly used in the fields of automobile, ship, aerospace, etc. A functionally graded lattice structure is a structural optimization of the lattice structure for an impact resistance application. Under an axial impact, the functionally graded lattice structure has a stepwise failure from low- to high-strength layers, and can absorb more energy than the uniform lattice structure under the same mass. A performance gradient design of the existing buffering energy-absorption graded lattice structure is generally implemented in two ways:

The first method is to adjust the rod diameter of a lattice cell, that is, to keep the external dimensions of each lattice cell unchanged and only change the rod diameter of each cell, thus realizing the performance gradient design of the lattice structure, as describe in the published Chinese patent CN107498948A. However, due to the size effect, the lattice structures with different unit cell sizes do not exhibit the same mechanical behavior under the same load. Therefore, it is required to consider an impact of the size of the lattice unit cell on the whole structural performance while changing the sectional size of the rod of the lattice unit cell.

The other method is to control the overall size of the lattice cells, that is, to change the overall size of each lattice cell. Through the design of a transition layer, the transition between large lattice cells and small lattice cells is realized, thus finally realizing the gradient design of the lattice structure, as described in the published invention patent CN109163212A. However, due to the size difference between the large lattice cells and the small lattice cells, stress concentration easily occurs at the cell junction. Therefore, consideration should be given to improving the mechanical properties of the cell without changing the size of the joints between the cells, so as to realize the gradient design of the structure performance.

SUMMARY

In view of the shortcomings in the prior art, the present disclosure provides a chiral cell having programmable stiffness, which has good impact resistance and is capable of torsional deformation under axial compression. Further, the chiral cell has a zero Poisson's ratio characteristic, that is, the overall structure of the chiral cell does not expand outwards in the compression process, so that the chiral cell structure has relatively high platform stress, and good energy absorption and impact resistance in the compression process.

To achieve the foregoing technical objective, the present disclosure adopts the following technical solutions:

A chiral cell having programmable stiffness is provided, which includes a cell structure, where the cell structure includes an upper ring, a middle ring, connecting rods, and a lower ring, and the connecting rods include upper connecting rods and lower connecting rods, where:

the upper ring and the lower ring have the same geometrical shape, and the middle ring is located between the upper ring and the lower ring; and the axes of the upper, middle, and lower rings all coincide with a central axis of the cell structure;

a plurality of upper connecting rods is provided; the two ends of each upper connecting rod are respectively correspondingly connected to the upper ring and the middle ring and the upper connecting rods are obliquely and uniformly distributed between the upper ring and the middle ring; and moreover, the upper connecting rods are arranged in different planes with respect to the central axis of the cell structure, and an angle $\theta$ is formed between each upper connecting rod and the central axis of the cell structure; and a plurality of lower connecting rods is provided; the two ends of each lower connecting rod are respectively correspondingly connected to the lower ring and the middle ring and the lower connecting rods are obliquely and uniformly distributed between the lower ring and the middle ring; and moreover, the lower connecting rods are arranged in different planes with respect to the central axis of the cell structure, and an angle $-\theta$ is formed between each lower connecting rod and the central axis of the cell structure.

Further, the upper connecting rods and the lower connecting rods are consistent in number and size, and a connection site of each upper connecting rod on the middle ring is located between connection sites of two adjacent lower connecting rods on the middle ring.

Further, the geometrical shapes of the upper and lower rings are circular rings.

Another technical objective of the present disclosure is to provide a graded lattice energy-absorbing structure established based on the foregoing chiral cell having programmable stiffness, which includes two or more cell layers arranged in tiers, where: each cell layer includes several cell structures with the same stiffness; and the stiffness of the cell layers arranged in tiers shows a gradient change from top to bottom;

for the cell structures in the same cell layer, the upper rings and the lower rings of two adjacent cell structures are both connected via beams, while the middle rings of two adjacent cell structures are alternately arranged;

between two adjacent cell layers, the cell layer located on the upper side is an upper-side cell layer, while that located on the lower side is a lower-side cell layer; and the cell structures of the upper-side cell layer and the cell structures of the lower-side cell layer are coaxially arranged in a one-to-one correspondence manner; and the lower rings of the cell structures in the upper-side cell layer and the upper rings of the corresponding cell structures in the lower-side cell layer are integrally connected or integrally designed.

Further, the angles θ and −θ of the cell structures on the same axis all have a gradient change from top to bottom, while the diameters of the connecting rods and the inner diameters of the middle rings of the cell structures on the same axis are correspondingly identical, so that the cell layers show a gradient change in stiffness from top to bottom; or the diameters of the connecting rods of the cell structures on the same axis all show a gradient change from top to bottom, while the angles θ and −θ and the inner diameters of the middle rings of the cell structures on the same axis are correspondingly identical, so that the cell layers show a gradient change in stiffness from top to bottom; or the inner diameters of the middle rings of the cell structures on the same axis all have a gradient change from top to bottom, while the angles θ and −θ and the diameters of the connecting rods of the cell structures on the same axis are correspondingly identical, so that the cell layers show a gradient change in stiffness from top to bottom.

Further, the cell layers comprise three cell layers, which are respectively an upper cell layer, a middle cell layer, and a lower cell layer, where:

the |angles θ| of the cell structures in the upper cell layer, the |angles θ| of the cell structures in the middle cell layer, and the |angles θ| of the cell structures in the lower cell layer are set in a descending order;

the |angles −θ| of the cell structures in the upper cell layer, the |angles −θ| of the cell structures in the middle cell layer, and the |angles −θ| of the cell structures in the lower cell layer are set in a descending order; and the diameters of the connecting rods and the inner diameters of the middle rings of any two cell structures are correspondingly identical.

Further, the cell layers comprise three cell layers, which are respectively an upper cell layer, a middle cell layer, and a lower cell layer, where:

the diameters of the connecting rods of the cell structures in the upper cell layer, the diameters of the connecting rods of the cell structures in the middle cell layer, and the diameters of the connecting rods of the cell structures in the lower cell layer are set in a descending order; and the angles θ and −θ, and the inner diameters of the middle rings of any two cell structures are correspondingly identical.

Further, the cell layers comprise three cell layers, which are respectively an upper cell layer, a middle cell layer, and a lower cell layer, where:

the inner diameters of the middle rings of the cell structures in the upper cell layer, the inner diameters of the middle rings of the cell structures in the middle cell layer, and the inner diameters of the middle rings of the cell structures in the lower cell layer are set in a descending order; and the angles θ and −θ, and the diameters of the connecting rods of any two cell structures are correspondingly identical.

Still another technical objective of the present disclosure is to provide a 3D printing method of a graded lattice energy-absorbing structure, where the foregoing graded lattice energy-absorbing structure is integrally formed by using spherical nickel-titanium alloy powder with a diameter of no more than 50 μm as raw materials and by means of selective laser melting technology, and processing parameters are as follows: a laser power of 250 W, a scanning speed of 1200 mm/s, a scanning pitch of 50 μm, and a spot diameter of 50 μm.

According to the foregoing technical solution, compared to the prior art, the present disclosure has the following advantages:

1. The cell structure described in the present disclosure has a deformation behavior of axial compression torsion, and shows a zero Poisson's ratio characteristic in a compression process, that is, in the compression process, the overall structure of the cell does not expand outwards, so that the cell itself has relatively high platform stress and good impact resistance.

2. In the present disclosure, cell structures with the same stiffness are connected via short horizontal beams to form a lattice layer (a cell layer), and cell structures of a lattice layer with a gradient change in stiffness are successively stacked upwards by overlapping the upper rings of the lower-side cell layer and the lower rings of the upper-side cell layer. Therefore, under the condition that the joints are kept unchanged in size, stress concentration is avoided at the interlayer junctions of the graded lattice structure in the cell design with programmable stiffness.

3. An instance of the present application provides a parametric cell design method, which can obtain cells with different mechanical properties by adjusting the structural parameters under the condition that the external size is kept unchanged. Then, the cells with different mechanical properties are applied in the design of a lattice structure, thus implementing the gradient design of the lattice structure.

4. An instance of the present application further considers a 3D printing method of the graded lattice structure. By selecting the nickel-titanium shape memory alloy as the base material, a self-supporting structure optimization design is made for the graded lattice structure, and the graded lattice structure can be integrally formed by means of selective laser melting technology. The processing method is easy, the forming quality is excellent, and the processing time is short. Through process exploration and experiments, the optimal processing parameters are obtained as follows: a laser power of 250 W, a scanning speed of 1200 mm/s, a scanning pitch of 50 μm, and a spot diameter of 50 μm.

Due to the hyper-elasticity of the nickel-titanium alloy, the graded lattice structure can produce greater deformation, enhancing its ability to absorb impact energy. Further, due to the memory effect of the nickel-titanium alloy, after deformation under impact, the graded lattice structure can return to its original shape and can be reused after being heated above the phase transition temperature.

Meanings of numerals from FIGS. 1 to 8: 1. Upper ring; 2. Middle ring; 3. Lower ring; 4. Upper connecting rod; 5. Lower connecting rod; 6-1. Upper cell layer; 6-2, middle cell layer; 6-3. Lower cell layer

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are some rather than all of the embodiments of the present disclosure. The following description of at least one exemplary embodiment is merely illustrative in nature and is in no way intended to pose any limitation on the present disclosure and its application or use. Based on the embodiments of the present disclosure, other embodiments acquired by those of ordinary skill in the art without creative effort all belong to the protection scope of the present disclosure. Unless specifically stated otherwise, the relative arrangements, expressions, and values of the components and steps set forth in these embodiments do not limit the scope of the present disclosure. In addition, it should be understood that for ease of description, the dimensions of the various parts shown in the drawings are not drawn in accordance with actual scale relationships. Techniques, methods, and apparatuses known to those of ordinary skill in the relevant art may not be discussed in detail, but the techniques, methods and apparatuses should be considered as part of the authorized specification if appropriate. In all examples shown and discussed herein, any specific value should be interpreted to be illustrative only but not restrictive. Therefore, other examples of the exemplary embodiments may have different values.

For ease of description, spatially relative terms such as "above", "over", "on the upper surface", "upper", etc. may be used herein to describe a spatial positional relationship between one device or feature and another device or feature shown in the drawings. It should be understood that, the spatially relative terms aim to contain different orientations of the device in use or operation other than those depicted in the drawings. For example, if the device in the drawings is inverted, the device described as "on another device or structure" or "above another device or structure" will then be positioned as "under another device or structure" or "below another device or structure". Therefore, the exemplary term "above" may include two orientations: "above" and "below". The device can also be positioned in other ways (through 90-degree rotation or in other orientations).

Embodiment 1

Figure 1:
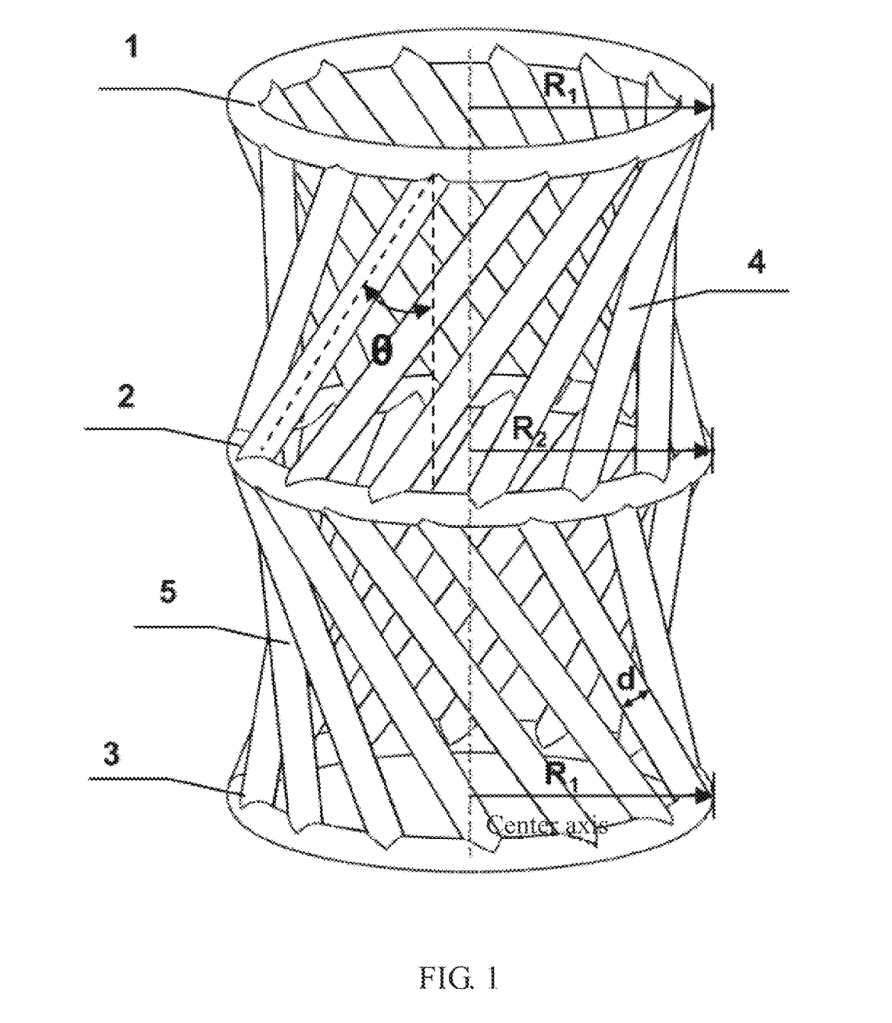
FIG. 1 is a schematic structural diagram of a unit cell in the present disclosure.
Figure 2:
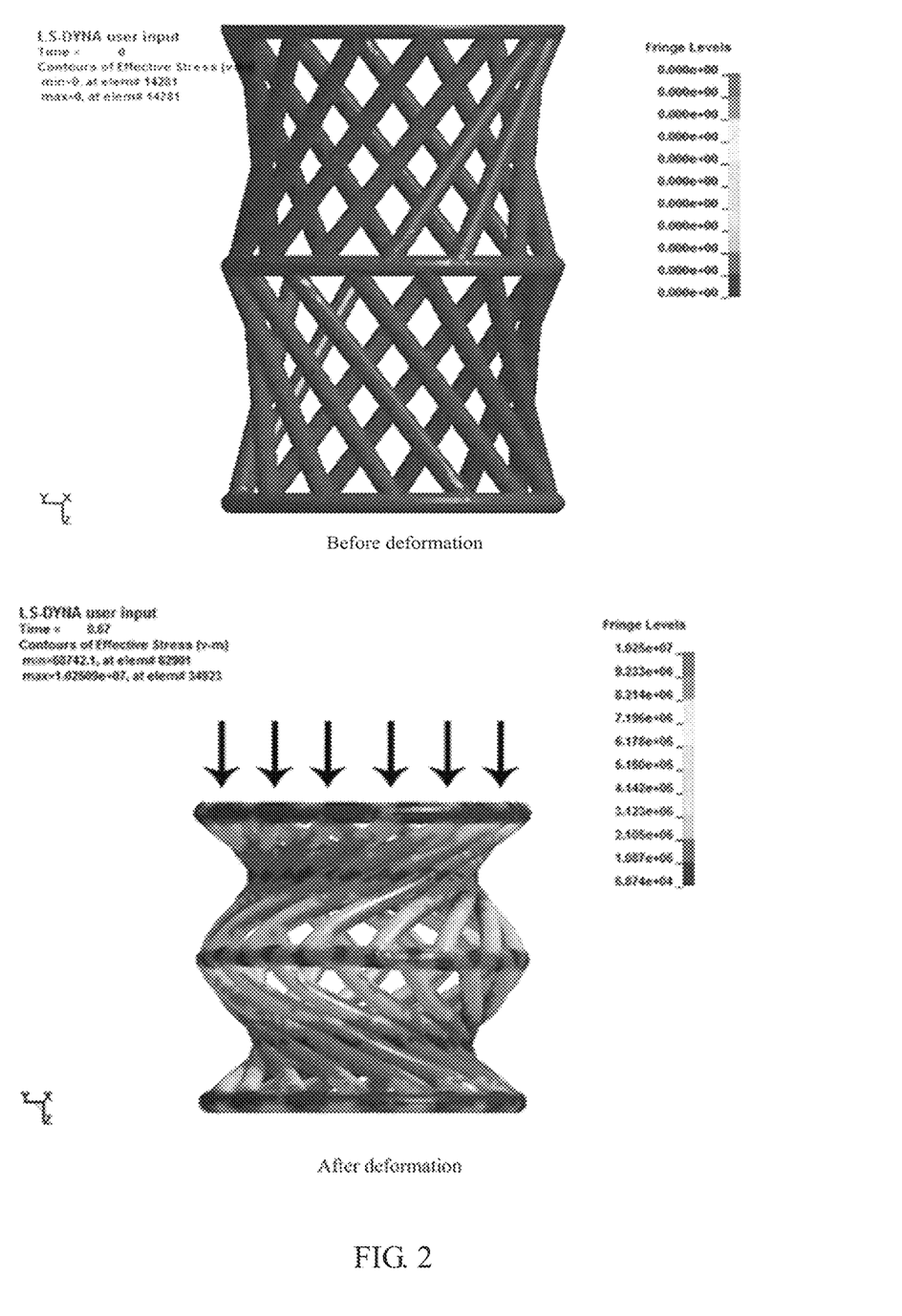
FIG. 2 shows structural diagrams of a unit cell before and after deformation under axial compression.

As shown in FIGS. 1 and 2, a chiral cell having programmable stiffness described in the present disclosure includes a cell structure which includes an upper ring, upper connecting rods, a middle ring, lower connecting rods, and a lower ring.

The upper ring and the lower ring have the same geometrical shape. In the accompanying drawings, the upper ring and the lower ring are both circular rings each having a radius of $R_1$. The middle ring is of any shape, and disposed between the upper ring and the lower ring. The axes of the upper, middle, and lower rings all coincide with a central axis of the cell structure.

A plurality of upper connecting rods is provided; the two ends of each upper connecting rod are respectively correspondingly connected to the upper ring and the middle ring and the upper connecting rods are obliquely and uniformly distributed between the upper ring and the middle ring. Moreover, the upper connecting rods are arranged in different planes with respect to the central axis of the cell structure, and an angle θ is formed between each upper connecting rod and the central axis of the cell structure. There are not less than 14 upper connecting rods. In the accompanying drawings, there are 14 upper connecting rods, and 14 connection sites are evenly distributed on a lower ring surface of the upper ring, which are connection sites A1, A2, . . . , A14. 14 connection sites are also evenly distributed on an upper ring surface of the middle ring, which are connection sites B1, B2, . . . , B14. The connection sites A1 to A14 and the connection sites B1 to B14 are in one-to-one correspondence, and the two ends of each upper connecting rod are respectively connected to a set of corresponding connection sites $A_i$ (i=1, 2, . . . , 14) and $B_j$ (j=1, 2, . . . , 14).

A plurality of lower connecting rods is provided; the two ends of each lower connecting rod are respectively correspondingly connected to the lower ring and the middle ring and the lower connecting rods are obliquely and uniformly distributed between the lower ring and the middle ring. Moreover, the lower connecting rods are arranged in different planes with respect to the central axis of the cell structure, and an angle −θ is formed between each lower connecting rod and the central axis of the cell structure. The lower connecting rods and the upper connecting rods are consistent in number. In the accompanying drawings, there are also 14 lower connecting rods, and 14 connection sites are evenly distributed on a lower ring surface of the middle ring, which are connection sites C1, C2, . . . , C14. 14 connection sites are also evenly distributed on an upper ring surface of the lower ring, which are connection sites D1, D2, . . . , D14. The connection sites C1 to C14 and the connection sites D1 to D14 are in one-to-one correspondence, and the two ends of each lower connecting rod are respectively connected to a set of corresponding connection sites $C_m$ (m=1, 2, . . . , 14) and Dn (n=1, 2, . . . , 14). In addition, it should be further noted that, in this embodiment, the connection site $B_j$ is located between two adjacent connection sites $C_m$ and $C_{m+1}$ on the middle ring.

The upper and lower connecting rods may be straight or curved rods. When they are straight rods, the rod diameter may be variable or invariable; and when they are invariable-diameter straight rods, the rod diameter is d. The angle θ, the radius $R_1$ of the upper ring, the radius $R_2$ of the lower ring, and the diameter d of the upper/lower connecting rod are cell structure parameters.

In order to verify a zero Poisson's ratio characteristic and its large deformation capability of a three-dimensional chiral torsion cell with the zero Poisson's ratio property provided in this embodiment, a finite element model for the three-dimensional chiral torsion cell with the zero Poisson's ratio characteristic provided in this embodiment is established in ANSYS software. The upper part of the cell is loaded with a uniformly distributed load.

Figure 3:
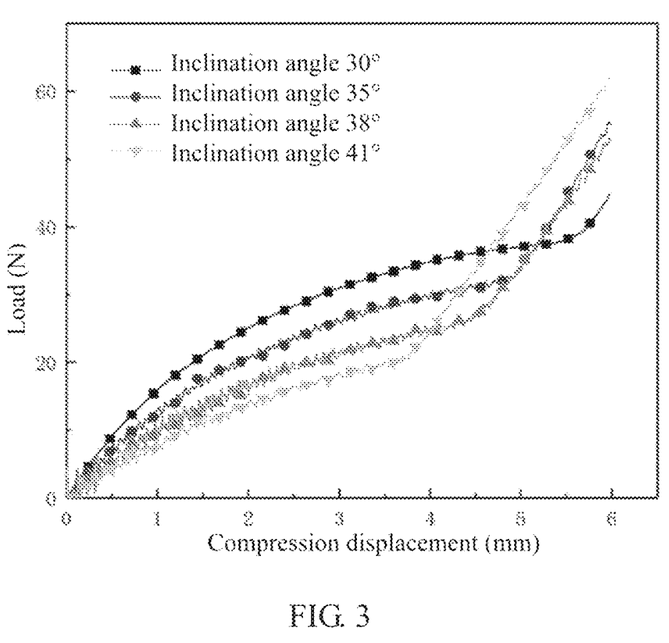
FIG. 3 is curve showing axial compression displacements of a unit cell at different inclination angles in the present disclosure.

A simulation result is as follows:

As shown in FIG. 2, when a uniform load is applied on the upper part of the cell structure, the middle ring 2 rotates and the cell does not have transverse expansion; the upper connecting rods 4 and the lower connecting rods 5 buckle, but the whole cell structure does not expand outwards, which reflects the characteristics of the zero Poisson's ratio and the torsion of a chiral structure under compression. Thus, the cell structure has relatively high platform stress, and good energy absorption and impact resistance in the compression process. Simulation of the mechanical properties of a unit cell is shown in FIG. 3, where the overall stiffness of the unit cell structure decreases stepwise as the inclination angle increases.

Embodiment 2

Figure 4:
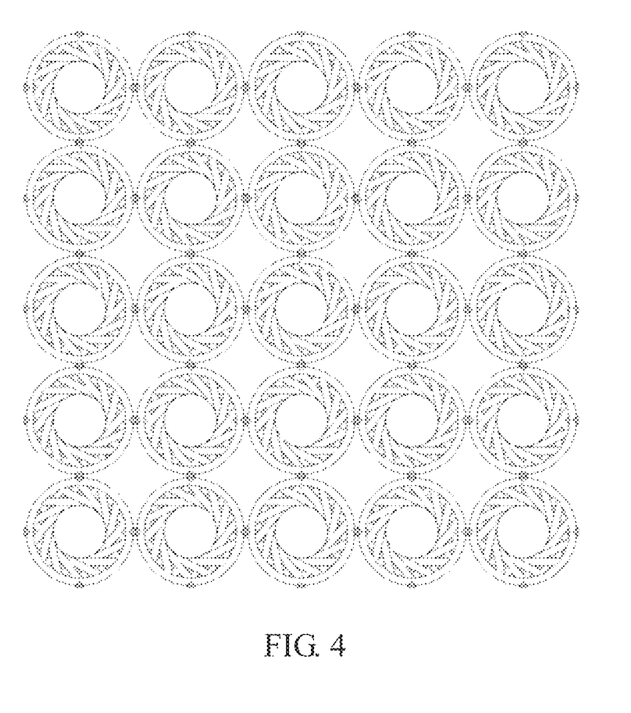
FIG. 4 is a schematic diagram of an arrangement manner of unit cells in a graded cell layer in the present disclosure.
Figure 5:
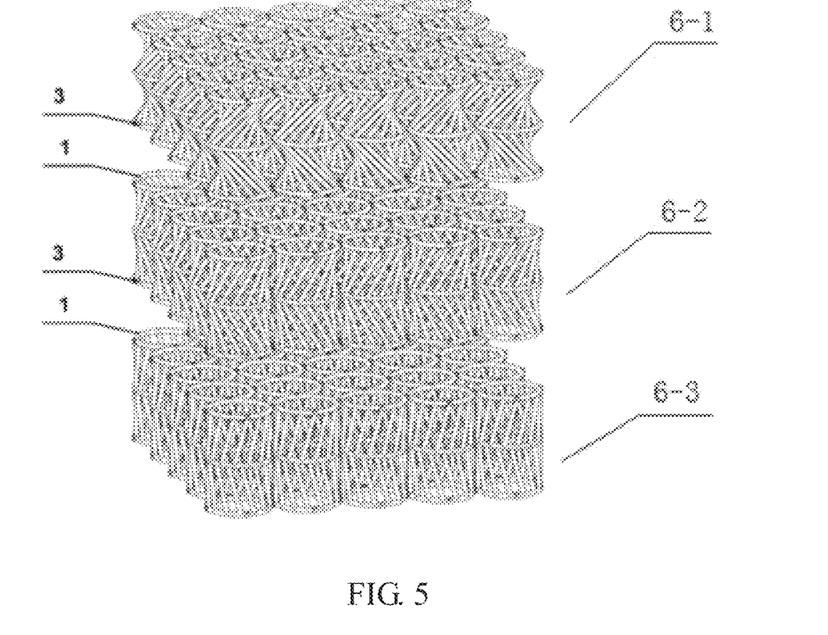
FIG. 5 is a schematic diagram of an arrangement manner of graded cell layers in the present disclosure.
Figure 6:
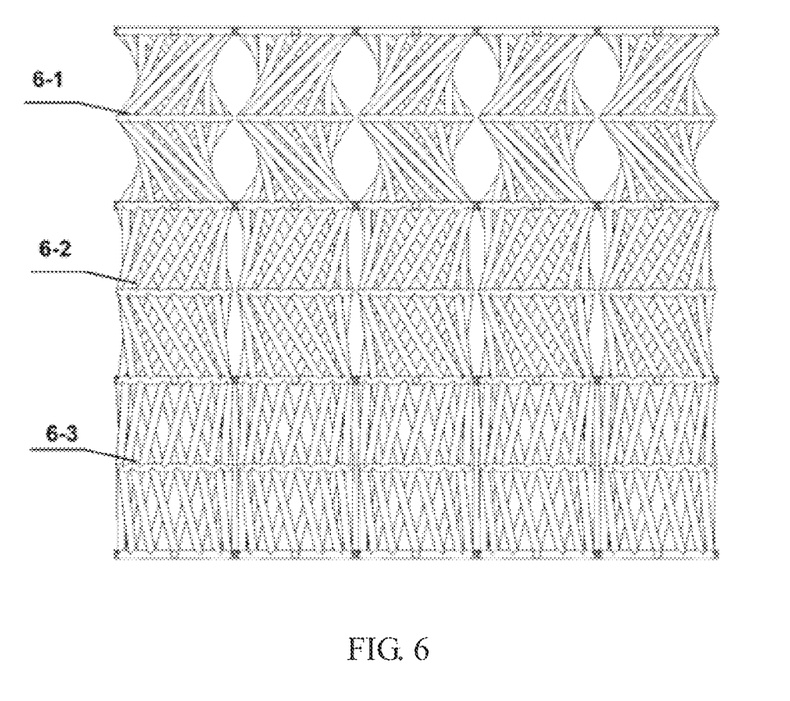
FIG. 6 is a graded lattice structure formed by cell bodies with a variable angle parameter θ.

As shown in FIGS. 4 to 6, a specific embodiment of a graded lattice structure described in the present disclosure is disclosed, where the structure includes three cell layers arranged in tiers which are an upper cell layer, a middle cell layer, and a lower cell layer from top to bottom. Alternatively, there are two cell layers in the present disclosure, or there are four or five cell layers in the present disclosure. In this case, the cell layers arranged in tiers have a gradient change in stiffness from top to bottom.

Each cell layer includes several cell structures with the same stiffness. For the cell structures in the same cell layer, the upper rings and the lower rings of two adjacent cell structures are both connected via beams, while the middle rings of two adjacent cell structures are alternately arranged.

When there are multiple cell layers, between two adjacent cell layers, the cell layer located on the upper side is an upper-side cell layer, while that located on the lower side is a lower-side cell layer. The cell structures of the upper-side cell layer and the cell structures of the lower-side cell layer are coaxially arranged in a one-to-one correspondence manner; and the lower rings of the cell structures in the upper-side cell layer and the upper rings of the corresponding cell structures in the lower-side cell layer can be integrally connected or integrally designed.

In other words, cell structures with the same stiffness are connected via short horizontal beams to form a lattice layer (a cell layer), and cell structures of a lattice layer with a gradient change in stiffness are successively stacked upwards by overlapping the upper rings of the lower-side cell layer and the lower rings of the upper-side cell layer.

In this embodiment, the upper, middle, and lower cell layers have sequentially increasing stiffness. That is, comparatively speaking, the upper cell layer is a low-stiffness cell layer, the middle cell layer is a middle-stiffness cell layer, and the lower cell layer is a high-stiffness cell layer. Definitely the upper, middle, and lower cell layers may also have sequentially decreasing stiffness.

The angles θ and −θ of the cell structures on the same axis have an increasing gradient from top to bottom. That is, the |angles θ| of the cell structures in the upper cell layer, the |angles θ| of the cell structures in the middle cell layer, and the |angles θ| of the cell structures in the lower cell layer are set in a descending order; and the |angles −θ| of the cell structures in the upper cell layer, the |angles −θ| of the cell structures in the middle cell layer, and the |angles −θ| of the cell structures in the lower cell layer are set in a descending order. The diameters of the upper connecting rods, the diameters of the lower connecting rods, and the inner diameters of the middle rings of the cell structures on the same axis are correspondingly identical. That is, the diameters of the upper connecting rods, the diameters of the lower connecting rods, and the inner diameters of the middle rings of any two cell structures are correspondingly identical, so that the cell layers have a decreasing gradient in stiffness from top to bottom.

In this embodiment, while other structural parameters are kept unchanged, the overall stiffness of the cell decreases with an increase in the angles θ under the condition that the external connection structure is kept unchanged in size.

In order to improve the impact resistance capability of the graded lattice structure, the nickel-titanium shape memory alloy is selected as the base material of the graded lattice structure, where the nickel-titanium shape memory alloy has the following characteristics:

(1) Excellent shape memory effect and hyper-elasticity: The polycrystalline nickel-titanium alloy for general engineering has a shape-reversible tensile strain of up to 8%, and a shape recovery ratio of up to 100% within this deformation range; and has good cycling stability. Its shape memory performance index can be adjusted by heat treatment and alloying within a certain range.

(2) Excellent mechanical properties: The mechanical strength and toughness of the nickel-titanium alloy with nearly equal atomic ratios are similar to the similar performance of low-to-medium carbon steel, and its mechanical properties can be controlled over a wide range by hot and cold working and heat treatment for metals. Among the existing shape memory alloys, the nickel-titanium alloy has the best fatigue resistance.

(3) Excellent corrosion resistance and biocompatibility (4) High damping characteristics (5) High reactivity and high plasticity, and not easy machining Therefore, considering angle constraints of selective laser melting forming, the graded lattice structure is integrally formed by means of selective laser melting (3D printing) technology. Through a process experiment and test, the optimized processing parameters are as follows: a laser power of 250 W, a scanning speed of 1200 mm/s, a scanning pitch of 50 μm, and a spot diameter of 50 μm. By use of the optimized process parameters, the selective laser melting has high precision, can shape a material with a density close to 100%, and can ensure consistency between design dimensions and actual dimensions.

Embodiment 3

Figure 7:
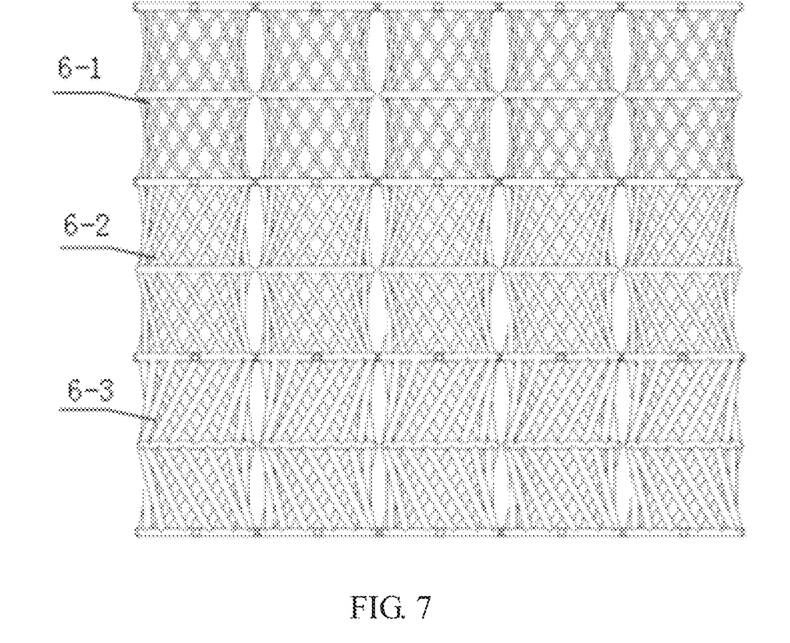
FIG. 7 is a graded lattice structure formed by cell bodies with a variable middle ring size parameter $R_2$.

This embodiment differs from Embodiment 2 in that the stiffness variation trend of the cell layers is realized in a different manner. Specifically, in this embodiment, as shown in FIG. 7, the diameters of the upper and lower connecting rods of the cell structures on the same axis have an increasing gradient from top to bottom. That is, the diameters of the upper/lower connecting rods of the cell structures in the upper cell layer, the diameters of the upper/lower connecting rods of the cell structures in the middle cell layer, and the diameters of the upper/lower connecting rods of the cell structures in the lower cell layer are set in a descending order. The angles θ and −θ, and the inner diameters of the middle rings of the cell structures on the same axis are correspondingly identical, so that the cell layers have an increasing gradient in stiffness from top to bottom.

In this embodiment, while other structural parameters of the cell structure are kept unchanged, the overall stiffness of the cell structure decreases with a decrease in the diameters d of the connecting rods (upper and lower connecting rods) under the condition that the external connection structure is kept unchanged in size.

Embodiment 4

Figure 8:
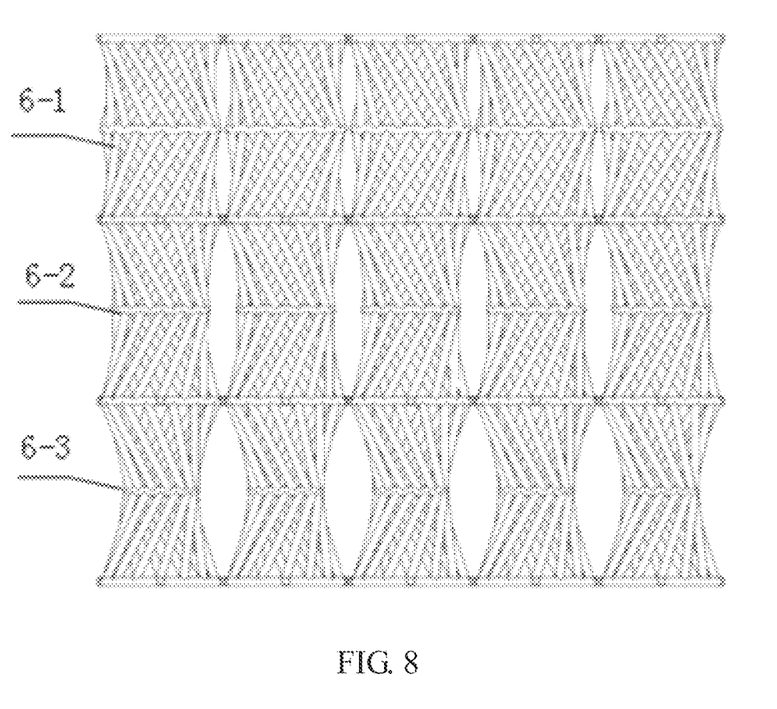
FIG. 8 is a graded lattice structure formed by cell bodies with variable diameters d of upper inclined rods 4 and lower inclined rods 5.

This embodiment differs from Embodiment 2 in that the stiffness variation trend of the cell layers is realized in a different manner. Specifically, in this embodiment, as shown in FIG. 8, the inner diameters of the middle rings of the cell structures on the same axis have a gradient change from top to bottom. That is, the inner diameters of the middle rings of the cell structures in the upper cell layer, the inner diameters of the middle rings of the cell structures in the middle cell layer, and the inner diameters of the middle rings of the cell structures in the lower cell layer are set in a descending order. The angles θ and −θ, the diameters of the upper connecting rods, and the diameters of the lower connecting rods of the cell structures on the same axis are correspondingly identical, so that the cell layers have a gradient change in stiffness from top to bottom.

In this embodiment, while other structural parameters of the cell structure are kept unchanged, the overall stiffness of the cell structure increases with a decrease in the radii $R_2$ of the middle rings under the condition that the external connection structure is kept unchanged in size.

What is claimed is:

1. A graded lattice energy-absorbing structure established based on a chiral cell having programmable stiffness, wherein, the chiral cell having programmable stiffness comprises a cell structure, the cell structure comprises an upper ring, a middle ring, connecting rods, and a lower ring, the connecting rods comprising a plurality of upper connecting rods and a plurality of lower connecting rods, wherein, the upper ring and the lower ring have the same geometrical shape, and the middle ring is located between the upper ring and the lower ring; and axes of the upper, middle, and lower rings all coincide with a central axis of the cell structure;

the plurality of upper connecting rods is provided; two ends of each upper connecting rod are respectively correspondingly connected to the upper ring and the middle ring and the upper connecting rods are obliquely and uniformly distributed between the upper ring and the middle ring; and moreover, the upper connecting rods are arranged in different planes with respect to the central axis of the cell structure, and an angle θ is formed between each upper connecting rod and the central axis of the cell structure; and the plurality of lower connecting rods is provided; two ends of each lower connecting rod are respectively correspondingly connected to the lower ring and the middle ring and the lower connecting rods are obliquely and uniformly distributed between the lower ring and the middle ring; and moreover, the lower connecting rods are arranged in different planes with respect to the central axis of the cell structure, and an angle −θ is formed between each lower connecting rod and the central axis of the cell structure, wherein, the graded lattice energy-absorbing structure comprises two or more cell layers arranged in tiers;

each cell layer comprises several cell structures with the same stiffness; and the stiffness of the cell layers arranged in tiers shows a gradient change from top to bottom;

for the cell structures in the same cell layer, the upper rings and the lower rings of two adjacent cell structures are both connected via beams, while the middle rings of two adjacent cell structures are alternately arranged;

between two adjacent cell layers, the cell layer located on the upper side is an upper-side cell layer, while that located on the lower side is a lower-side cell layer; and the cell structures of the upper-side cell layer and the cell structures of the lower-side cell layer are coaxially arranged in a one-to-one correspondence manner; and the lower rings of the cell structures in the upper-side cell layer and the upper rings of the corresponding cell structures in the lower-side cell layer are integrally connected or integrally designed.

2. The graded lattice energy-absorbing structure according to claim 1, wherein the angles θ and −θ of the cell structures on the same axis all have a gradient change from top to bottom, while the diameters of the connecting rods and the inner diameters of the middle rings of the cell structures on the same axis are correspondingly identical, so that the cell layers show a gradient change in stiffness from top to bottom; or the diameters of the connecting rods of the cell structures on the same axis all show a gradient change from top to bottom, while the angles θ and −θ and the inner diameters of the middle rings of the cell structures on the same axis are correspondingly identical, so that the cell layers show a gradient change in stiffness from top to bottom; or the inner diameters of the middle rings of the cell structures on the same axis all have a gradient change from top to bottom, while the angles θ and −θ and the diameters of the connecting rods of the cell structures on the same axis are correspondingly identical, so that the cell layers show a gradient change in stiffness from top to bottom.

3. The graded lattice energy-absorbing structure according to claim 1, wherein the cell lays comprise three cell layers, which are respectively an upper cell layer, a middle cell layer, and a lower cell layer, wherein:

the angles θ of the cell structures in the upper cell layer, the angles θ of the cell structures in the middle cell layer, and the angles θ of the cell structures in the lower cell layer are set in a descending order;

the angles −θ of the cell structures in the upper cell layer, the angles −θ of the cell structures in the middle cell layer, and the angles −θ of the cell structures in the lower cell layer are set in a descending order; and the diameters of the connecting rods and the inner diameters of the middle rings of any two cell structures are correspondingly identical.

4. The graded lattice energy-absorbing structure according to claim 1, wherein the cell layers comprises three cell layers, which are respectively an upper cell layer, a middle cell layer, and a lower cell layer, wherein:

the diameters of the connecting rods of the cell structures in the upper cell layer, the diameters of the connecting rods of the cell structures in the middle cell layer, and the diameters of the connecting rods of the cell structures in the lower cell layer are set in a descending order; and the angles θ and −θ, and the inner diameters of the middle rings of any two cell structures are correspondingly identical.

5. The graded lattice energy-absorbing structure according to claim 1, wherein the cell layers comprise three cell layers, which are respectively an upper cell layer, a middle cell layer, and a lower cell layer, wherein:

the inner diameters of the middle rings of the cell structures in the upper cell layer, the inner diameters of the middle rings of the cell structures in the middle cell layer, and the inner diameters of the middle rings of the cell structures in the lower cell layer are set in a descending order; and the angles θ and −θ, and the diameters of the connecting rods of any two cell structures are correspondingly identical.

6. The graded lattice energy-absorbing structure according to claim 1, wherein the upper connecting rods and the lower connecting rods are consistent in number and size, and a connection site of each upper connecting rod on the middle ring is located between connection sites of two adjacent lower connecting rods on the middle ring.

7. The graded lattice energy-absorbing structure according to claim 1, wherein the geometrical shapes of the upper and lower rings are circular rings.

8. A 3D printing method of a graded lattice energy-absorbing structure, characterized in that: the graded lattice energy-absorbing structure described in claim 1 is integrally formed by using spherical nickel-titanium alloy powder with a diameter of no more than 50 μm as raw materials and by means of selective laser melting technology, wherein processing parameters are as follows: a laser power of 250 W, a scanning speed of 1200 mm/s, a scanning pitch of 50 μm, and a spot diameter of 50 μm.

* * * * *